Patented Nov. 12, 1935

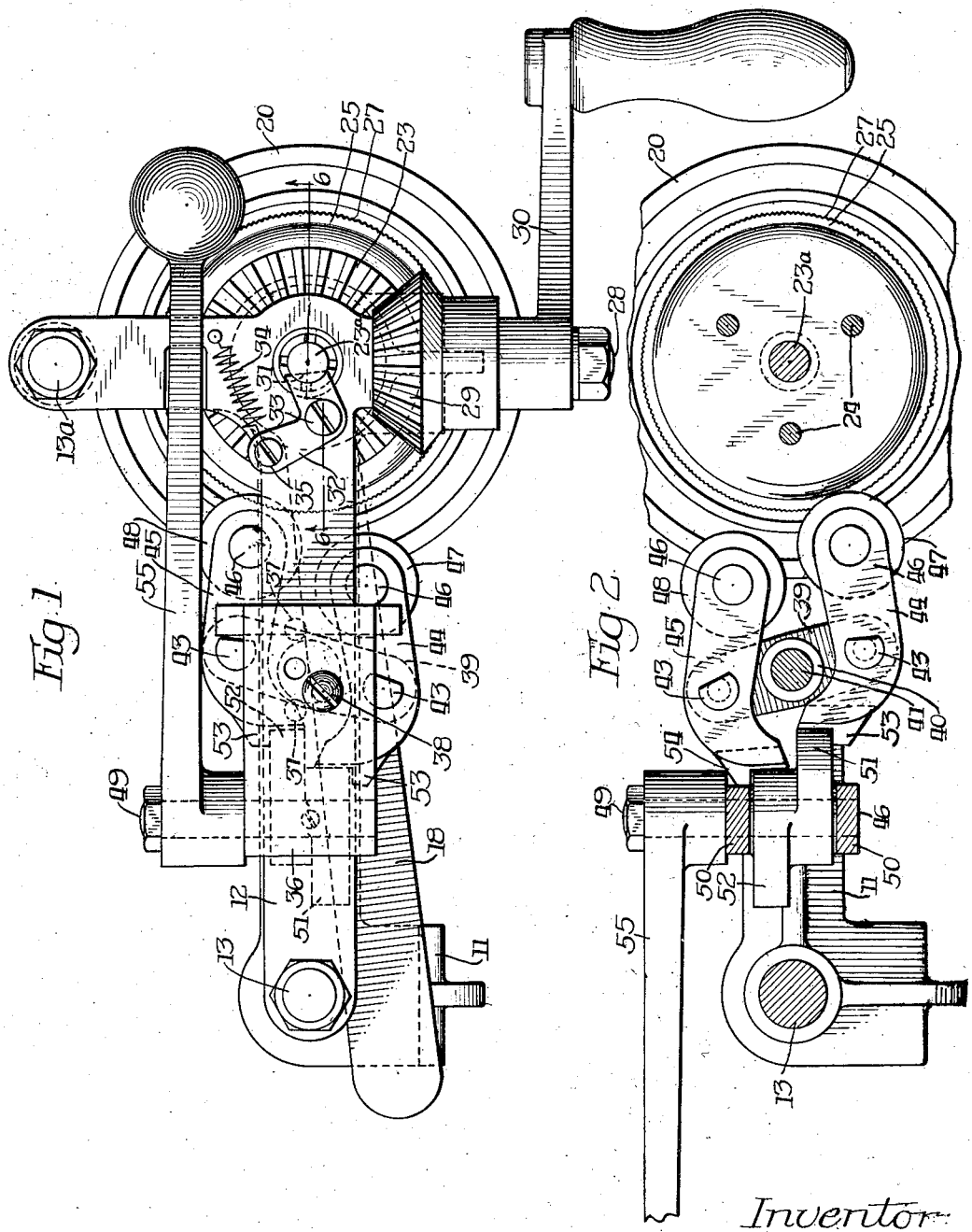

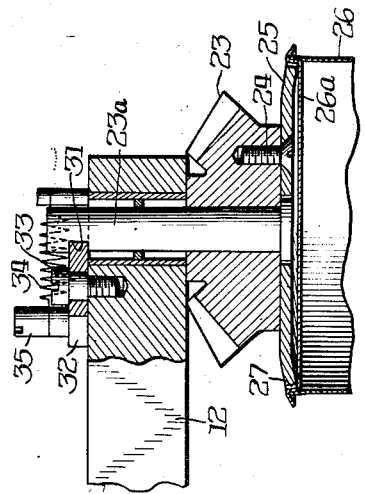

2,020,472

UNITED STATES PATENT OFFICE 2,020,472

CAN SEALING MACHINE

Fred W. Leuthesser, Jr., Chicago, Ill., assignor to Automatic Canning Devices, Inc., Chicago, Ill., a corporation of Illinois Application December 16, 1932, Serial No. 647,574

5 Claims. (Cl. 113—23)

The present invention relates to canning devices of the portable type, adapted to the sealing of filled tin cans by the seaming of the lid to such cans in such manner as to effect hermetic closure of the same; also by the mere interchange of rollers to enable the severing of the can adjacent the lid in the act of opening the same, and the subsequent spinning of the opened can edge enabling it to be reused and a new lid applied.

The primary objects of the invention are the provision in such a machine of means whereby to attain certainty of operation within a wide range of step-by-step adjustment, adapting the machine to varying sizes of cans; such object being attained in an assembly inexpensive to manufacture and efficiently operable without the requirement of any considerable degree of mechanical skill on the part of the user.

Other valuable features of the invention will be readily apparent from the following description predicated upon one embodiment of the same as set forth by way of illustration in the accompanying drawings wherein Fig. 1 is a top plan;

Fig. 2 is a horizontal section on the line 2—2 of Fig. 3;

Fig. 3 is a side elevation;

Fig. 4 is a vertical median section through Fig. 5;

Fig. 5 is a vertical section on the line 5—5 of Fig. 3; and

Fig. 6 is a horizontal section on the line 6—6 of Fig. 1.

Having more particular reference to the drawings there is provided a frame including a pedestal 11, an upper cross member 12 and uprights 13 and 13a with clamp screws 14 for detachably securing a machine to a table top 15 or the like. The pedestal 11 has a portion provided with a cam surface 16 for cooperation with another cam surface 17 upon the head of the lever 18.

Within the pedestal 11 is slidably journaled a spindle 19, upon the upper end of which is rotatably mounted a can-supporting chuck 20, while beneath said chuck is provided a collar 21, and a spring 22 is interposed between the lever head 17 and the collar 21, whereby the upward movement of the can chuck 20 under the action of the cams 16 and 17 is a yielding one. This chuck is adapted to receive and center different standard sizes of can, usually three.

Journaled in one end of the cross member 12 upon the spindle 23a in vertical alignment is a beveled gear 23 to which is attached as by means of screws 24 a lid chuck 25 of a size corresponding to the can 26 supported upon the can chuck 20. This lid chuck is preferably provided with a knurled edge 27 which, engaging on the inner upper edge of the can 26, serves to rotate the same with the gear 23. Journaled in the cross member 12 upon the horizontal spindle 28 is a companion beveled gear 29 in mesh with the beveled gear 23, while a handle 30 fixed upon the spindle 28 serves as manual means for driving said gears.

The pinion 23 with the chuck 25 may be bodily removed from its mounting in the cross member 12 (as best shown in Fig. 6) by the provision in the spindle 23a of a notch 31 into which one end of a detent 32 engages, said detent being pivoted on a pin 33 and pressed by a spring 34 into said recess from which it may be withdrawn by a finger piece 35.

A slide member 36 is mounted for movement upon said cross member in a straight or right line direction towards and away from that end which carries the gears. The location of the slide 36 upon the cross member 12 is positively adjustable step-by-step in any one of a plurality of positions, here shown as three, whereby to adapt it to different sizes of cans. In the present embodiment this is accomplished by providing the cross member 12 with a plurality of apertures 37 with which may be alternatively engaged the set screw 38 carried by the slide.

A cross link 39 is pivoted intermediate its length upon the sleeve 40 threaded upon a stud 41 secured to the slide 36, the positioning of the sleeve being attained by its slotted head 42. Upon both ends of the cross link 39 are pivoted at 43 yokes 44 and 45, free to swing laterally upon their pivots. The ends of the yokes 44 and 45 adjacent the lid chuck 25 have journaled between their upper and lower portions upon pivots 46 seaming rollers 47 and 48 in horizontal alignment with and adapted to cooperate with the knurled edge 27 of the lid chuck 25 to effect a seamed connection between the can and its lid, when said rollers are pressed into engagement therewith, in known manner.

A cam shaft 49 is journaled in depending arms 50 of the slide 36 at that side of the slide distant from the lid chuck. This cam shaft presents angularly displaced cam surfaces 51 and 52 disposed respectively in line with the two yokes 44 and 45, the adjacent ends of the yokes 44 and 45 being provided respectively with guiding wings 53 and 54 to assure proper engagement of the cams and to limit the lateral play of said yokes.

The cam shaft 49 has fixed to one end a lever arm 55 by means of which the said cam shaft may be rocked between a vertical dead center position of the lever arm and the two extreme horizontal positions as illustrated respectively in Figs. 1 and 2.

In operation a filled can is placed upon the can chuck 20, as indicated in Fig. 3, and by means of the lever 18 and the coacting cams 16 and 17 the can 26 is lifted into engagement at its upper end with a lid 26ª carried by the lid chuck, said lid having its peripheral edge engaged by the knurled rim of the chuck within the upper periphery of the can. The lever arm 55 is swung from its dead center position to the left, as indicated in Fig. 2, thereby causing the cam 51 to engage the yoke 44, moving the same to the right to bring the seaming roll 47 into engagement with the edge of the lid. This position of engagement is fixed inasmuch as the lever arm 55 has been thrown to its extreme position, and the user is thus relieved from any exercise of judgment as to the degree of pressure to be applied by the seaming roll 47. By means of the handle 30 the gears 28 and 23 effect the rotation of the can chuck, the can, the lid chuck and the lid, and the pressure upon the lid edge by the seaming roll 47 effects a partial turning of the same for which the groove 47ª is adapted. Thereupon the lever arm 55 is swung to the other extreme position, as represented in Figs. 1 and 4, thereby moving by the cam 52 the yoke 45 and its seaming roll 48 into engagement with the can edge and at the same time withdrawing the yoke 44 and its seaming roll 47 by means of the swinging of the cross link 39 upon its pivot. The seaming roll 48 is thereby brought into engagement with the can edge and lid to complete the seaming operation for which its groove 48ª is adapted.

The sealing operation being completed, the lever arm 55 is swung to its vertical dead center position, positioning both of the yokes and seaming rolls in an inoperative position out of engagement with the can, whereupon the lever 18 is swung to permit the can chuck 20 to drop and release the can from engagement with the lid chuck. The can may then be removed and replaced by another to be sealed.

It will be observed that the uprights 13 and 13ª are offset, that is to say the upright 13 supports one end of the cross member 12 in line with the movement of the slide 16 and the axis of the can and lid chucks, whereas the upright 13ª is offset laterally to one side and supports an angular portion of the L-shaped cross member, in the angle of which L is the axis for the chucks. By this arrangement there is no obstruction to the placing of cans in the machine and removing them.

I claim:

1. In a portable can sealing machine, the combination with a frame including a pedestal and uprights and an upper cross member, freely rotatable means carried by the frame for supporting a can, a rotatable chuck for engaging a lid in pressure contact with the can top, means for rotating the chuck and with it the can, of a slide movable upon the upper cross member towards and from the chuck, a yoke pivoted relative to the slide, a seaming roller mounted on that end of yoke adjacent the chuck, a cam shaft journaled in the slide on that side opposite the chuck and presenting a cam face in line with the roller bearing yoke, and an arm fixed to the cam shaft, whereby upon swinging the arm the seaming roller will be moved into engagement with the can and lid held by the chuck.

2. In a portable can sealing machine, the combination with a frame including a pedestal and uprights and an upper cross member, a freely rotatable can-holding chuck carried by the frame and adjustable as to height for yieldingly supporting a can, a rotatable lid-holding chuck for engaging a lid in pressure contact with the can top, and manually operable means for rotating the lid chuck and with it the can, of a slide movable upon the upper cross member towards and from the chuck, two yokes movable relative to the slide, a seaming roller mounted on that end of each yoke adjacent the lid chuck, a cam shaft journaled in the slide on that side opposite the chuck and presenting angularly displaced cam faces in line with the roll-bearing yokes, and an arm fixed to the cam shaft whereupon swinging the arm in alternate directions the seaming rolls will be alternately moved into engagement with the can top and lid held by the chuck.

3. In a portable can sealing machine, the combination with a frame including a pedestal and uprights and an upper cross member, a freely rotatable can-holding chuck carried by the frame and adjustable as to height for yieldingly supporting a can, a rotatable lid-holding chuck for engaging a lid in pressure contact with the can top, and manually operable means for rotating the lid chuck and with it the can, of a slide movable upon the upper cross member towards and from the chuck, a cross link pivoted intermediate its length to the slide, a yoke pivoted to each end of the cross link, a seaming roller mounted on that end of each yoke adjacent the lid chuck, a cam shaft journaled in the slide on that side opposite the chuck and presenting angularly displaced cam faces in line with the roll-bearing yokes, and an arm fixed to the cam shaft whereupon swinging the arm in alternate directions the seaming rolls will be alternately moved into engagement with the can top and lid held by the chuck, the cams having a terminal dwell portion to limit the movement of the rolls towards the chuck.

4. In a portable can sealing machine, the combination with a frame including a pedestal and uprights and an upper cross member, freely rotatable means carried by the frame for supporting a can, a rotatable chuck for engaging a lid in pressure contact with the can top, and means for rotating the chuck and with it the can, of a slide movable upon the upper cross member towards and from the chuck, a yoke movable relative to the slide, a seaming roller mounted on that end of yoke adjacent the chuck, a cam shaft journaled in the slide on that side opposite the chuck and presenting a cam face in line with the roller bearing yoke, and an arm fixed to the cam shaft, whereby upon swinging the arm the seaming roller will be moved into engagement with the can and lid held by the chuck, the slide having means of step-by-step adjustment relative to the cross member whereby to adapt the seaming mechanism to different standard can sizes.

5. In a portable can sealing machine, the combination with a frame including a pedestal and uprights and an upper cross member, a freely rotatable can-holding chuck carried by the frame and adjustable as to height for yieldingly supporting a can, a rotatable lid-holding chuck for engaging a lid in pressure contact with the can top, and manually operable means for rotating the lid chuck and with it the can, of a slide movable upon the upper cross member towards and from the chuck, a yoke pivoted relative to the slide, a seaming roller mounted on that end of each yoke adjacent the lid chuck, a cam shaft journaled in the slide on that side opposite the chuck and presenting angularly displaced cam faces in line with the roll-bearing yokes, and an arm fixed to the cam shaft whereupon swinging the arm in alternate directions the seaming rolls will be alternately moved into engagement with the can top and lid held by the chuck, the cross member having a plurality of apertures for the alternative reception of a set screw carried by the slide whereby to adapt the seaming mechanism to different standard can sizes.

FRED W. LEUTHESSER, Jr.